Figures 1, 2:
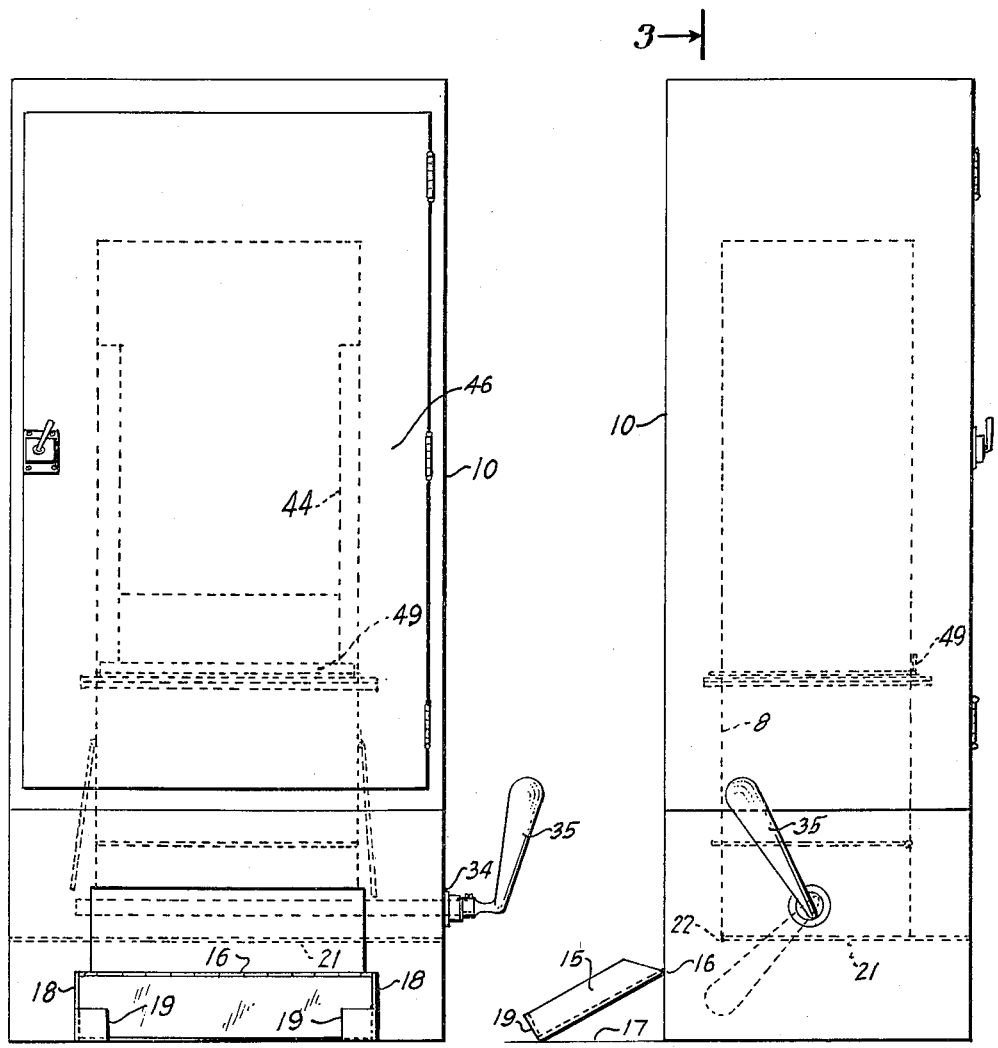

Sept. 19, 1961        J. HALLER        3,000,538

FOOD-VENDING MACHINE

Filed Aug. 6, 1956        3 Sheets-Sheet 1

INVENTOR.
Jacob Haller
BY
A. Schapp
ATTORNEY

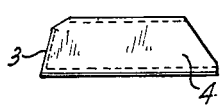
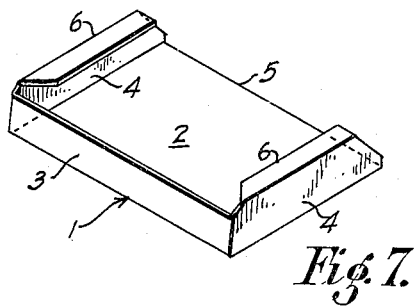
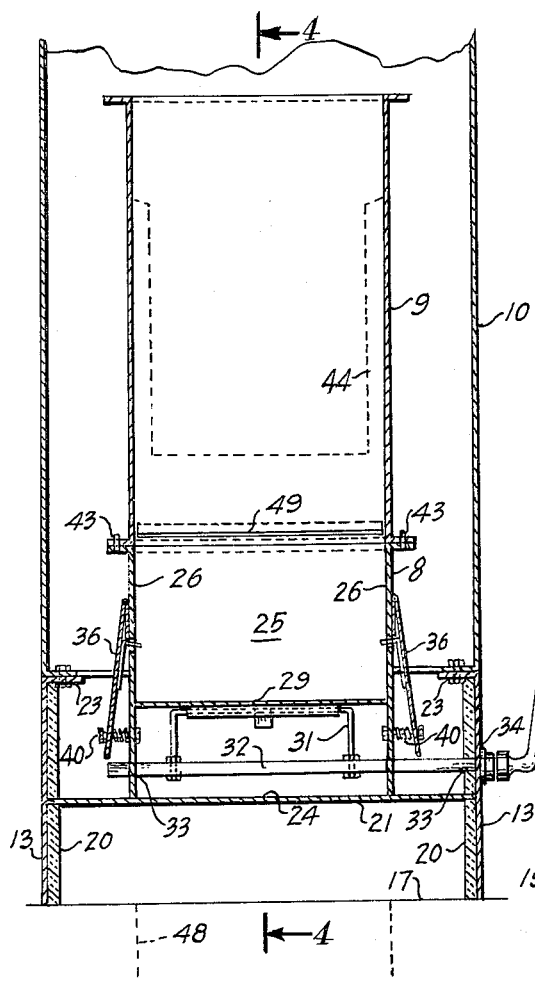
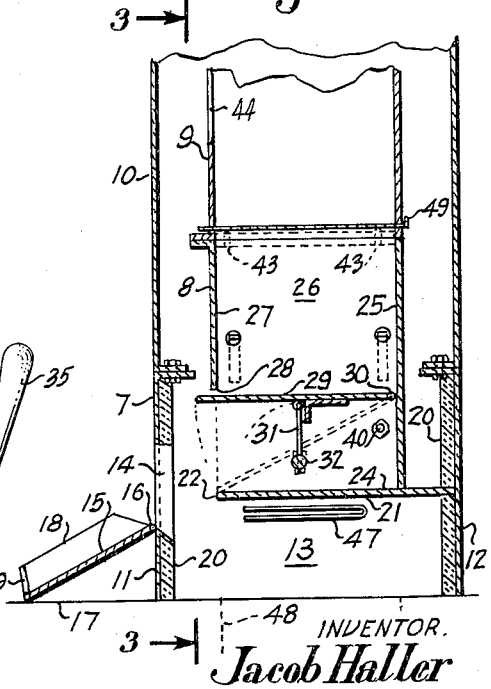

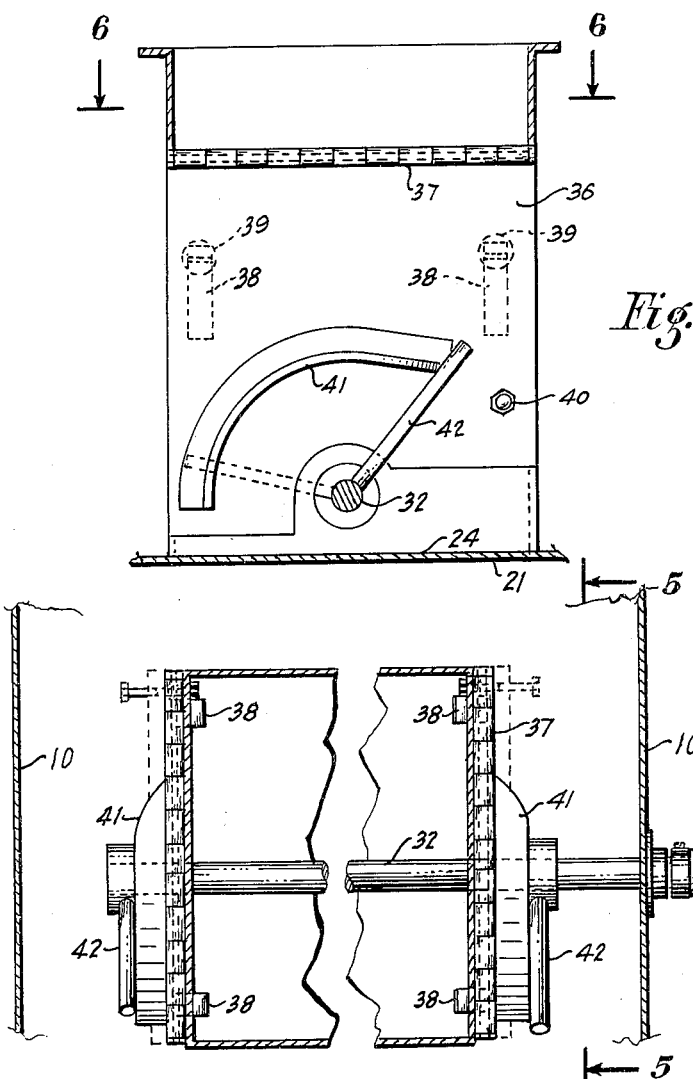

United States Patent Office 3,000,538
Patented Sept. 19, 1961

3,000,538
FOOD-VENDING MACHINE
Jacob Haller, 533 41st Ave., San Francisco, Calif.
Filed Aug. 6, 1956, Ser. No. 602,206
8 Claims. (Cl. 221—69)

The present invention relates to improvements in food vending machines, and its principal object is to provide a machine of the character described in which various items of food such as might make up a complete meal, are arranged on a tray, and the machine is operative for placing the tray before the customer for the latter to help himself to the contents thereof.

More particularly, it is proposed to form the trays in such a manner that a plurality of food-laden trays may be arranged in stacked relation and to provide mechanism whereby individual trays may be successively removed from the bottom of the stack.

It is further proposed to provide a tiltable platform for supporting the stack, and means for tilting the platform whereby the lowermost tray is made to slide off the platform, means being also provided for temporarily supporting the remainder of the stack until the platform returns to its supporting position.

It is a further feature of my invention to provide a chute for supporting the stacked tray assembly and to provide a magazine chute removably secured upon the main chute for facilitating re-filling operations.

It is still further proposed to arrange the magazine reversible so that it may be refilled from the front of the machine or from the rear thereof to suit conditions and circumstances.

And finally, it is proposed to enclose the chute and the magazine in a housing which has insulated walls and which may be heated from below to keep the food on the trays at a desired temperature.

Further objects and advantages of my invention will appear as the specification continues, and the new and useful features of the machine will be fully defined in the claims attached hereto.

The preferred form of my invention is illustrated in the accompanying drawings, forming part of this application, in which:

FIGURE 1 shows a front view of my vending machine;

FIGURE 2, a side view thereof;

FIGURE 3, a vertical section taken along line 3—3 of FIGURE 2;

FIGURE 4, a fragmentary vertical section taken along line 4—4 of FIGURE 3;

FIGURE 5, a side view of the chute forming part of my invention;

FIGURE 6, a horizontal section through the chute taken along line 6—6 of FIGURE 5;

FIGURE 7, a perspective view of a tray used in my machine;

FIGURE 8, a front view of the tray; and

FIGURE 9, a side view of the same.

While I have shown only the preferred form of my invention, it should be understood that various changes or modifications may be made within the scope of the claims hereto attached, without departing from the spirit of the invention.

Referring to the drawings in detail, my vending machine is intended for the dispensing of food from trays 1, each tray being preferably rectangular in shape and having a flat bottom 2, a rear flange 3, side flanges 4 and a free front edge 5 over which the food is discharged.

The side flanges are slightly higher than the rear flange, and their upper ends are turned inwardly to present two tongues 6 projecting over the tray and adapted to serve as a supporting means for a superimposed tray. This structure allows any number of trays to be arranged in stacked relation, each tray being sufficiently deep to allow a desired number of food items to be arranged thereon without projecting above the tongues 6.

My food-vending machine comprises in its principal features a rectangular base structure 7, a chute 8 supported therein, a magazine 9 supported on the chute, and a housing 10 supported on the base structure.

The base structure 7 comprises a front wall 11, a rear wall 12 and side walls 13, and has an opening 14 in the front wall proportioned to allow a tray to be discharged therethrough in the operation of the machine.

The lower edge of the opening 14 has a receiving tray 15 hinged thereto, as at 16, with the lower end of the receiving tray resting on the general supporting floor 17 of the machine. The receiving tray is dimensioned to receive the food trays as they are discharged from the machine, and is provided with side flanges 18 and bottom stops 19 to arrest the descending food tray.

The walls of the base structure are preferably well-insulated, as at 20.

Intermediate the height of the base structure, there is provided a raised floor 21. This floor is somewhat higher than the hinge 16, as shown, and stops short of the front wall of the base structure to provide a free edge 22 over which the food trays may be discharged upon the receiving tray.

The upper edges of the base structure have inwardly turned flanges 23.

The chute 8 is also rectangular in cross-section and similar to the base structure except that it is considerably smaller in horizontal section, so that it fits into the base structure with ample clearance all around. It comprises the floor 21, a rear wall 25, side walls 26, and a front wall 27, which latter extends only through the upper portion of the chute and stops short at the edge 28.

The chute 8 is dimensioned to receive and confine therein a stack of food trays 1. The trays are supported on a platform 29 hinged to the rear wall, as at 30, at an elevation so that it projects forwardly, just underneath the edge 28 when the platform is disposed horizontally.

The platform 29 is normally supported in horizontal position by a yoke 31 having its ends anchored in a horizontal shaft 32 supported in the side walls of the chute, as at 33, centrally below the platform. The shaft extends outside through one of the side walls of the base structure, as at 34, and is provided outside said structure, with a handle 35.

When the handle is in the position indicated in FIGURES 3 and 4, that is, upright, it holds the platform in horizontal position so as to give support to a stack of trays disposed on the platform.

When the handle is operated to swing the yoke downward, that is, toward the opening 14, the platform will also swing downward, the parts being dimensioned to bring the front edge of the platform to rest on the front edge 22 of the floor 21, and to allow a tray disposed on the platform to slide downward over the front edge of the platform and through the opening 14 upon the receiving tray 15 until its movement is arrested by the stops 19. The food will continue on and slide over the free front edge 5 of tray 1 and onto a counter, or, if necessary the food may be removed by lifting from tray 1, the edge 5 facilitating the latter operation.

However, where there is a stack of trays present in the chute, it becomes necessary to support the remainder of the stack while the lowermost one is removed.

This is accomplished by means of a pair of plates 36 hinged upon the side walls of the chute (see FIGURE 5) on the outside thereof, and well above the platform, as at 37, each plate having a pair of inwardly projecting lips or catches 38 adapted to project through registering holes 39 in the side walls of the chute.

The catches and holes are located so that when the catches are forced inwardly, they will engage under the second tray, the tapers in the side flanges of the trays allowing of such engagement, without in any way affecting the movement of the lowermost tray.

The plates 36 have spring means, indicated at 40 for normally crowding the free ends of the plates away from the side walls of the chute so as to render the catches inactive, but on the outside of each plate there is provided a cam 41 engageable by an arm 42 projecting from the shaft 32 for forcing the plates inwardly and the catches underneath the second tray immediately upon initiation of the shaft turning movement.

Thus, when the handle 35 is turned for releasing the lowermost tray, the arm 42 riding on the cam 41, immediately crowds the catches into position for supporting the second tray, and, on continuation of the turning movement, the yoke 31 allows the platform 29 to drop into inclined position for discharging the lowermost food tray upon the receiving tray 15.

The chute is preferably dimensioned to accommodate a limited number of trays, say three, and necessarily becomes a more or less fixed part of the base structure.

To facilitate reloading and unloading, and to increase the capacity of the machine, I provide the magazine 9, which is built to the same dimensions as the chute and is of much greater length. It may be lowered upon the chute from above and secured by means of registering flanges 43 having cooperative pins and slots arranged in such a manner that the position of the magazine may be readily reversed.

One end wall of the magazine, either the front or the rear, is entirely open to facilitate loading, except for retaining flanges 44, and the reversibility of the magazine allows the open end to be presented forwardly or rearwardly to suit the convenience of the operator.

The housing 10 may be superimposed on the base structure, as at 45, to surround the upper end of the chute and the magazine, the housing being provided with a front door 46 and being reversible on its support to bring the front door into registry with the magazine opening.

The base structure and the housing are suitably insulated in a conventional manner, and an electric heater 47 may be provided under the floor 21 to maintain the food at a desired temperature, the floor being suitably perforated to allow the heat to circulate.

If found desirable, my machine may be mounted over a chute 48, so that, upon emptying the food tray, the operator may tilt the receiving tray upward for discharging the empty food tray into the chute.

In case it is desired to remove the magazine for refilling operations, the magazine is provided with a slide 49 immediately adjacent its bottom end to serve as a temporray floor for supporting the stacked trays, and which may be readily removed after the magazine has been positioned on the chute.

In operation:

With the chute and the magazine filled with trays, the customer, having deposited a coin, if the machine is coin-controlled, merely turns the handle 35 through a quarter of a turn.

During the initiation of the turning movement, the arms 42 on the shaft 32 strike the cams 41 and force the catches 38 to engage underneath the second food tray, so as to give independent support to the stack of trays, and to free the lowermost tray for discharge.

On continuation of the turning movement, the yoke 31 swings forwardly and allows the platform 29 to swing downward on its pivot 30, until the front edge of the platform strikes the edge 22 of the floor 21.

The lowermost tray is now ready to slide down the platform and upon the receiving tray 15. The diner may then remove the food from the food tray and tilt the front end of the receiving tray upward to cause the empty food tray to slide into the chute 48 underneath the machine.

An attendant may re-fill the magazine through the door opening of the housing, or may remove the magazine for refilling and replacing, or may be furnished a number of filled magazines for successive use in connection with the machine.

The catches 38 may be readily arranged for vertical adjustment to allow of the use of food trays of different heights.

I claim:

1. In a food vending machine, a tray adapted to have food items disposed thereon, a platform adapted for supporting the tray, a hinge supporting the rear edge of the platform, means for normally supporting the body of the platform in horizontal position, and means operable for releasing the latter means to cause the tray to drop into inclined position and to allow the tray to slide off the platform, the tray having rear and side flanges only rising therefrom to confine the food items and providing a free front edge allowing the said items to slide thereover for final discharge, and the side flanges having inwardly turned tongues to serve as supporting means for additional trays.

2. In a food vending machine, a tray adapted to have food items disposed thereon, a platform adapted for supporting the tray, a hinge supporting the rear edge of the platform, means for normally supporting the body of the platform in horizontal position, and means operable for releasing the latter means to cause the tray to drop into inclined position and to allow the tray to slide off the platform, the tray having rear and side flanges only rising therefrom to confine the food items and providing a free front edge allowing the said items to slide thereover for final discharge, and the side flanges having inwardly turned tongues to serve as supporting means for additional trays, and the releasing means including means for supporting the additional trays prior to the tilting of the lowermost tray.

3. In a food vending machine, a chute adapted to receive a stack of trays therein, means for vertically supporting the chute, a bottom platform for the chute having its rear edge hinged to the rear edge of the chute, a shaft revolvably mounted underneath the platform and having a yoke secured to the shaft for rotation therewith and adapted for bearing against and supporting the platform in horizontal position when the yoke is in upright position and for guiding the platform toward inclined position when the yoke is swung downward, and means for actuating the shaft, including means for isolating the lowermost tray with respect to the remainder of the stack so as to allow the lowermost tray to slide down the inclined platform.

4. In a food vending machine, a chute adapted to receive a stack of trays therein, means for vertically supporting the chute, a bottom platform for the chute having its rear edge hinged to the rear edge of the chute, a shaft revolvably mounted underneath the platform and having a yoke secured to the shaft for rotation therewith and adapted for bearing against and supporting the platform in horizontal position when the yoke is in upright position and for guiding the platform toward inclined position when the yoke is swung downward, and means for actuating the shaft, including means for isolating the lowermost tray with respect to the remainder of the stack so as to allow the lowermost tray to slide down the inclined platform, the latter means comprising a pair of plates hingedly suspended from the side walls of the chute on the outside thereof and above the height of the lowermost tray and having confronting lips projectable through apertures in the side walls at an elevation immediately below the second tray, means active on the plate for normally holding the lips in inactive position, a cam on each plate and means on the shaft cooperating with the cams for pushing the lips inwardly into supporting position with respect to the next lowermost tray at the initiation of the turning movement of the shaft.

5. In a food vending machine, a rectangular base structure having a raised floor, a rectangular chute supported on the floor and adapted to have a plurality of trays accommodated therein in stacked relation, means for successively discharging individual trays from the bottom of the stack, a tray magazine commensurate with the chute and means for removably securing the magazine upon the chute, the magazine having a sliding bottom removable upon the positioning of the magazine, and the magazine having a filler opening in one wall thereof and being reversible upon the chute to present the opening in one direction or the opposite direction.

6. In a food vending machine, a rectangular base structure having a raised floor, a rectangular chute supported on the floor and adapted to have a plurality of trays accommodated therein in stacked relation, means for successively discharging individual trays from the bottom of the stack, a tray magazine commensurate with the chute, means for removably securing the magazine upon the chute, and a housing for the upper end of the chute and the magazine removably secured upon the base structure, the magazine and the housing having registering filler openings and both being reversible to present their filler openings in one direction or the opposite direction.

7. In a food vending machine, a platform adapted for supporting the lowermost of a stack of trays which are adapted for slidably supporting food items and which have rear and side flanges rising therefrom to confine the food items and a flange-free front edge, with the side flanges having inwardly turned tongues to serve as supporting means for additional trays, means for normally supporting the platform in horizontal position, and means operable for releasing the latter means so as to cause the tray to drop into inclined position whereby said lowermost tray will be free to slide from the platform, means providing confronting lips formed for engagement under opposite sides of the next lowermost of said stack of trays for supporting the stack when said platform drops into inclined position, a receiving tray mounted in the plane of the platform when the latter is in said inclined position and spaced therefrom by a distance less than the width of the trays but greater than the height of said flanges, stop means on said receiving tray formed for engaging and halting the tray while permitting the food items to slide therefrom under the influence of momentum, said receiving tray being pivotally mounted for swinging movement to reverse the tilt thereof whereby the empty tray will slide through the space between said platform and said receiving tray, and a chute positioned below said opening and formed to receive the empty trays in a stack.

8. In a food vending machine, a tray adapted to have food items disposed thereon, a tiltable platform adapted for supporting the tray in horizontal position, means operable for causing the tray to move into inclined position to allow the tray to slide off the platform, and a receiving tray mounted substantially in the plane of and below said platform when in said inclined position and spaced therefrom by a distance less than the width of said first named tray but greater than its height, said receiving tray being pivoted at its upper edge whereby it may be tilted up to cause said first named tray to slide therefrom through the space between said receiving tray and said platform.

References Cited in the file of this patent
UNITED STATES PATENTS

| | | |
|---|---|---|
| 775,350 | Gerard | Nov. 22, 1904 |
| 1,005,998 | Munchausen | Oct. 17, 1911 |
| 1,272,515 | Peck | July 16, 1918 |
| 1,555,955 | Weaver | Oct. 6, 1925 |
| 1,683,519 | Blair et al. | Sept. 4, 1928 |
| 1,734,045 | Parran | Nov. 5, 1929 |
| 1,788,221 | Williams | Jan. 6, 1931 |
| 2,324,811 | Auslander | July 20, 1943 |
| 2,345,074 | Sargent et al. | Mar. 28, 1944 |
| 2,419,229 | Preis | Apr. 22, 1947 |
| 2,420,812 | Brunner | May 20, 1947 |
| 2,576,874 | Acton | Nov. 27, 1951 |
| 2,643,169 | Wells et al. | June 23, 1953 |